United States Patent [19]

Malon et al.

[11] Patent Number: 4,468,500
[45] Date of Patent: Aug. 28, 1984

[54] AMINO KETONE CROSS-LINKED POLYPHENYLENE OXIDE

[75] Inventors: Raymond F. Malon, Edmundson; Anthony Zampini, St. Louis, both of Mo.

[73] Assignee: Monsanto Company, St. Louis, Mo.

[21] Appl. No.: 509,611

[22] Filed: Jun. 30, 1983

[51] Int. Cl.³ .............................................. C08G 65/48
[52] U.S. Cl. ........................................ 525/390; 55/16; 55/158; 210/500.2
[58] Field of Search ............................... 525/390, 905

[56] References Cited

U.S. PATENT DOCUMENTS

| | | | |
|---|---|---|---|
| 3,262,892 | 7/1966 | Hay | 260/2.2 |
| 3,306,874 | 2/1967 | Hay | 260/47 |
| 3,306,875 | 2/1967 | Hay | 260/47 |
| 3,330,806 | 7/1967 | Borman | 260/47 |
| 3,334,069 | 8/1967 | Borman | 260/47 |
| 3,337,499 | 8/1967 | Bussink et al. | 260/47 |
| 3,375,298 | 3/1968 | Fox | 260/830 |
| 3,396,146 | 8/1968 | Schmukler | 260/47 |
| 3,406,147 | 10/1968 | Schmukler | 260/47 |
| 3,630,900 | 12/1971 | van der Voort | 525/390 |
| 3,729,433 | 4/1973 | Bilow | 525/390 |
| 3,780,496 | 12/1973 | Ward et al. | 55/16 |
| 3,875,114 | 4/1975 | Swiger | 525/390 |
| 4,321,331 | 3/1982 | Widiger, Jr. | 525/379 |

FOREIGN PATENT DOCUMENTS 31730 7/1979 European Pat. Off. .

Primary Examiner—Christopher A. Henderson
Attorney, Agent, or Firm—Thomas E. Kelley; Henry Croskell

[57] ABSTRACT

Cross-linked polyphenylene oxide compositions comprise the reaction product of haloacylated polyphenylene oxide and a primary monoamine. The polyphenylene oxide chains are cross-linked by amino ketone bonding. Such cross-linked polymers are useful as membranes, for instance gas separation membranes.

6 Claims, No Drawings

AMINO KETONE CROSS-LINKED POLYPHENYLENE OXIDE

BACKGROUND OF THE INVENTION

This invention relates to cross-linked polyphenylene oxide compositions. More particularly, it relates to such compositions where polyphenylene oxide chains are cross-linked with amino ketone bonding provided by reaction with a primary monoamine.

The polyphenylene oxides are a body of thermoplastics disclosed in U.S. Pat. Nos. 3,306,874 and 3,306,875, incorporated herein by reference. They are characterized by a unique combination of chemical, physical and electrical properties over a temperature range of more than 600° F., extending from a brittle point of minus 275° F. to a heat distortion temperature of 375° F. In particular, the polyphenylene oxides combine high tensile strength and tensile modulus with a high softening temperature, and excellent resistance to water, steam, strong acids and alkalies.

Some polyphenylene oxides also exhibit exceptional transport properties making them useful as membranes for separation processes such as ion exchange, ultra filtration, reverse osmosis, pervaporation and even gas permeation.

However, the polyphenylene oxides also have certain undesirable characteristics that are common to most thermoplastic materials. For example, their resistance is most common organic solvents is low. Aromatic and chlorinated hydrocarbon solvents dissolve phenylene oxide polymers, while other solvents and solvent vapors induce crazing in molded polyphenylene oxide parts under stress, causing loss of strength. The tensile properties of the resins decrease steadily with increasing temperature, and drop off sharply at about 200° C. Further, under extreme prolonged stress, molded parts formed from the polyphenylene oxides tend to creep, causing permanent deformation.

It is known that these disadvantages which are common to most thermoplastic materials, may be overcome by cross-linking the individual polymer molecules during, or after, the forming of the material into its final shape. Thus, if a sufficient number of cross-linking sites are present, the material can be cross-linked and will then no longer be soluble, but only swell to a greater or lesser extent. Also, while the phenomenon of solvent crazing is not fully understood, it appears to involve crystallization of the polymer molecules. As the mobility of the polymer molecule is limited by cross-linking, crystallization is no longer possible, and thus the problem of solvent crazing is removed. The limitation on molecular mobility also prevents the polymer from flowing, even above its melting point, thus preventing, to a large degree, creep and loss of tensile properties at increased temperature.

The polyphenylene oxides are, to a high degree, chemically inert, a desirable characteristic from a materials standpoint. However, because of this inertness the prior art has experienced difficulty in introducing cross-links between polymer chains, and structurally different units generally, by simple chemical processes. For example, prolonged heating in air will render the polymer insoluble in aromatic or chlorinated hydrocarbon solvents, but the degree of cross-linking accomplished is quite low, and the materials produced swell to a considerable degree.

Cross-linked polyphenylene oxides have been disclosed by Borman in U.S. Pat. No. 3,330,806 and by Schmukler in U.S. Pat. No. 3,406,147. Borman disclosed a cross-linkable polyphenylene oxide without the disadvantages of degradation and brittleness resulting from heat-induced cross-linking by introducing hydroxyl radicals into the polyphenylene oxide resin. The hydroxyl substituted polyphenylene oxide could then be cross-linked by reaction, for instance with a formaldehyde-releasing substance such as hexamethylenetetramine. Schmukler attempted to overcome deficiencies in cross-linked polyphenylene oxides by providing a plurality of side chain acyloxy groups on the polymer chain. Cross-linking could then be induced at elevated temperatures by aromatic substitution in the presence of a Lewis acid or by transesterification with a difunctional material reactive with the acyloxy group. A disadvantage of such cross-linked polyphenylene oxides as disclosed by Borman or Schmukler is that the cross-linked resin comprises by-products of the cross-linking reaction which are detrimental to the utility of such cross-linked resins for gas permeation purposes.

Ward et.al. in U.S. Pat. No. 3,780,496 disclose sulfonated polyxylelene oxide membranes for use in gas separations where the hydrogen ion form of the sulfonate substituent can be converted to a metal counter ion form. Ward et.al. disclose that such membranes have some utility in gas separation. A principal disadvantage is that the presence of water can be detrimental in membrane formation. Accordingly, the preparation of such membranes in a water-based coagulating system is impractical.

SUMMARY OF THE INVENTION

The present invention provides a cross-linked phenylene oxide polymer composition comprising the reaction product of a haloacylated phenylene oxide polymer and a primary monoamine. Preferred monoamines include methylamine, ethylamine, n-propylamine, n-butylamine and aniline. Preferred cross-linked phenylene oxide polymer compositions include the reaction product of chloroacetylated poly(2,6-dimethyl-1,4-phenylene oxide) and a primary monoamine where there are from 0.01 to 2.0 haloacyl groups per phenylene oxide unit. Such cross-linked phenylene oxide polymer compositions have amino ketone cross-linkage between phenyl groups, represented by the structural formula —$COCH_2NRCH_2CO$—, where R is methyl, ethyl, propyl, butyl or phenyl.

DESCRIPTION OF THE PREFERRED EMBODIMENTS

This invention provides cross-linked phenylene oxide polymer compositions comprising the reaction product of a haloacylated phenylene oxide polymer and a primary monoamine. The haloacylated phenylene oxide polymer which is useful in such a cross-linked phenylene oxide polymer composition will generally have at least one alkyl group on each phenylene ring. The alkyl group can vary in size and may have from 1 to 3 carbon atoms or more. In most cases there will be two alkyl groups on each phenylene ring with both alkyl groups being in an ortho position with respect to the oxygen of the phenylene oxide. The preferred alkyl group attached to the phenylene ring is the methyl group; accordingly a preferred phenylene oxide polymer is the haloacylated polymer of 2,6-dimethyl-1,4-phenylene oxide.

Such haloacylated phenylene oxide polymer will have halogenated acyl groups substituted onto the phenyl ring, for instance at the meta position with respect to the oxygen of the phenylene oxide. Useful halogentaed acyl groups include halogenated acetyl, such as chloroacetyl or bromoacetyl, halogenated propionyl, such as 2-chloropropionyl. Other acyl groups which can be halogenated at the alpha position may be desirable in the polymer of this invention and include butyryl groups.

The acyl groups are halogenated at the alpha carbon atom, that is the carbon atom next to the carbon atom having the C=O bond. Preferred halogens are chlorine and bromine, although it may be useful and desirable in some instances to utilize flourine or iodine.

In order for cross-linking reaction to occur between the haloacylated phenylene oxide polymer and a primary monoamine it is not necessary that an active acyl halogen atom be present at each phenylene group of the polymer. In this regard it is often adequate for formation of the cross-linked phenylene oxide polymer composition that there be sufficient acyl halogen atoms per phenylene oxide unit such that the cross-linking reaction can occur. In this regard haloacyl substituted phenylene oxide polymer is useful in the cross-linking reaction when there are at least 0.01 acyl halogen atoms per phenylene oxide unit. Cross-linking reactions also readily occur when there are up to 1.0, or more, acyl halogen atoms per phenylene oxide unit. Preferably the haloacylated phenylene oxide polymer will comprise from 0.01 to 1.0 haloacyl groups per phenylene oxide unit of poly(2,6-dimethyl-1,4-phenylene oxide).

The cross-linked phenylene oxide polymer compositions of this invention will have cross-linkage between phenylene groups represented by the structural formula —COCHR'NRCHR'CO—, where R is an alkyl or phenyl and where R' is hydrogen or an alkyl, such as methyl, ethyl or propyl.

The cross-linked phenylene oxide polymer compositions of this invention are useful wherever it is desirable to utilize a polyphenylene oxide having resistance to organic solvents and improved physical properties. A preferred use for such cross-linked polyphenylene oxide polymer composition is as a membrane, for instance a selectively permeable gas separation membrane. Such membranes can be provided in either film or hollow fiber form.

FORMATION OF HALOGENATED POLYPHENYLENE OXIDE

A preferred method of forming the haloacylated polyphenylene oxide precursor is to substituted a haloacyl group onto an alkylated polyphenylene oxide. Such alkylated polyphenylene oxides can comprise a poly(2,6-dialkyl-1,4-phenylene oxide), such as a poly(2,6-dimethyl-1,4-phenylene oxide).

The acylation can be effected by Friedel-Crafts acylation procedures using an acid anhydride, acid chloride or free acid in the presence of a Friedel-Crafts catalyst. Desirably the acid anhydride is halogenated at the alpha position. The acylation can be effected by adding the halogenated acid anhydride to a solution of the polyphenylene oxide in a solvent, for instance a halogenated solvent such as 1,2-dichloroethane. A useful Friedel-Crafts catalyst is trifluoromethyl sulfonic acid.

Acylation should be carried out under conditions which avoid undesirable side reactions. Reaction under moderate temperatures of about 80° C., or lower have provided reasonable acylation.

After maintaining reaction conditions for a suitable period of time to achieve the desired degree of acylation, the solution can be cooled and a base added to neutralize by-product acid and catalyst.

The haloacylated polymer can be recovered by precipitation in a non-solvent such as methanol. Desirably the non-solvent must be suitable for removing residual reactant and catalyst.

CROSS-LINKING OF HALOGENATED POLYPHENYLENE OXIDE

The haloacylated polyphenylene oxide can be cross-linked before or after forming the haloacylated polyphenylene oxide into a useful form. In many cases it is desirable to cross-link the preformed article of the haloacylated polyphenylene oxide. The cross-linking reaction can be effected with a primary monoamine as the cross-linking agent. The primary monoamine can be utilized either in gaseous form such as gaseous methylamine or in a liquid form, for instance as a solution of a primary monoamine. Such solutions can be aqueous solutions or organic solutions of primary monoamine.

Cross-linking can be effected by any means of contacting the cross-linking agent with active halogen on the haloacylated polyphenylene oxide membrane under conditions which do not deleteriously effect the preformed structure of the polymer. In the case of cross-linking with methylamine gas it is generally sufficient to expose the haloacylated polyphenylene oxide membranes to the methylamine gas, for instance in a confined space. Exposure at mild conditions, for instance ambient temperature and atmospheric pressure, are often sufficient to effect adequate crosslinking. Cross-linking can be effected to a higher degree by employing more severe reaction conditions, for instance higher pressure and/or higher temperature.

In the case of cross-linking of haloaceylated polyphenylene oxide membranes with solutions of a primary monoamine, for instance aqueous solutions of n-propylamine, effective cross-linking can often be obtained by simply soaking the haloacylated polyphenylene oxide membrane in the solution for a reasonable time. Of course more extensive cross-linking can be effected by utilizing more severe reaction conditions, for instance higher temperatures.

The invention is further illustrated by, but not limited to, the following example.

EXAMPLE 1

This example illustrates the preparation of a polyarylene oxide substituted with a halogenated acyl group, chloroacetyl. The example further illustrates the formation of a membrane from such polymer and the cross-linking of the membrane with the primary monoamine, methylamine.

5 grams of poly(2,6-dimethyl-1,4-phenylene oxide) having a weight average molecular weight, MW, of 49,000 was dissolved in 100 ml of 1,2-dichloroethane. Some of the solvent was distilled to remove water. 7.5 grams of chloroacetic anhydride and 0.5 milliliters of trifluoromethyl sulfonic acid were added to the solution which was then heated to a boil. The solution was allowed to reflux for two hours while protected with a drying tube. After the solution was cooled to room temperature, three grams of potassium carbonate was added and the mixture stirred for 25 minutes. The solution was filtered and added to 1600 milliliters of methanol causing the chloroacetylated polyarylene oxide to precipitate. The halogenated polymer was washed with methanol and dried for three days at 50° C. in a vacuum oven. The yield was 6.1 grams (about 75 percent of the theoretical yield). The polymer was found by microelemental analysis to contain 67.1 percent carbon, 5.5 percent hydrogen and 11.6 percent chlorine. Calculations, based on the chlorine content, indicated the polymer contained about 0.53 chloroacetyl groups per repeating phenylene oxide unit.

Dense film membranes of the chloroacetylated poly(2,6-dimethyl-1,4-phenylene oxide) polymer were cast from chloroform. The permeation properties for membranes of this haloacylated precursor polymer were determined.

The membrane was treated with an aqueous solution of 10.4 percent by weight of methylamine at 23° C. for seven days. The membrane was washed in water for two days and dried at 80° C. The permeation properties of the primary monoamine cross-linked polymer were determined. The permeation properties are listed in Table I.

TABLE I

|  | $P_{H_2}$* | $P_{CO_2}$* | $\alpha H_2/CH_4$ | $\alpha CO_2/CH_4$ |
| --- | --- | --- | --- | --- |
| Precursor | 58 | 44 | 24 | 21 |
| $CH_3NH_2$ Cross-linked | 43 | 23 | 38 | 23 |

*Intrinsic permeabilities are in units of $10^{-10}$ cm$^3$ (STP) cm/cm$^2$-sec-cmHg.

The foregoing description of embodiments of this invention is not intended to be a limitation to the scope of this invention. As will be apparent to those skilled in the art, many variations and modifications can be made to the composition of this invention as described in the above embodiments without departing from the spirit and scope of this invention.

We claim:

1. A cross-linked polyphenylene oxide polymer composition comprising the reaction product of a haloacylated phenylene oxide polymer and a primary monoamine selected from the group consisting of methylamine, ethylamine, a propylamine, a butylamine and aniline, wherein there is amino ketone cross-linkage between phenylene groups represented by the structural formula —COCHR'NRCHR'CO—, where R is methyl, ethyl, propyl, butyl or phenyl and where R' is hydrogen, methyl, ethyl or propyl.

2. The composition of claim 1 wherein the phenylene oxide polymer has at least one alkyl group having 1 to 3 carbon atoms, said alkyl groups being in an ortho position on the phenylene ring with respect to the oxygen of the phenylene oxide.

3. The composition of claim 2 wherein the phenylene oxide has two methyl groups.

4. The composition of claim 3 wherein the haloacyl group comprises haloacetyl, halopropionyl or halobutyryl.

5. The composition of claim 4 wherein the haloacyl groups have halogen selected from the group consisting of chlorine or bromine.

6. A cross-linked phenylene oxide polymer composition comprising the reaction product of haloacylated poly(2,6-dimethyl-1,4-phenylene oxide) and a primary monoamine selected from the group consisting of methylamine, ethylamine, a propylamine, a butylamine and aniline wherein there are from 0.1 to 1.0 acyl halogen atoms per phenylene there are from 0.1 to 1.0 acyl halogen atoms per phenylene oxide unit, and wherein there is amino ketone cross-linkage between phenylene groups represented by the structural formula —COCH$_2$NRCH$_2$CO—, where R is methyl, ethyl, propyl, butyl or phenyl.

* * * * *

UNITED STATES PATENT AND TRADEMARK OFFICE
CERTIFICATE OF CORRECTION

PATENT NO. : 4,468,500
DATED : August 28, 1984
INVENTOR(S) : Raymond F. Malon and Anthony Zampini It is certified that error appears in the above—identified patent and that said Letters Patent is hereby corrected as shown below:

In Claim 6, line 32, after the word "wherein", please delete "there are from 0.1 to 1.0 acyl halogen atoms per phenylene"

Signed and Sealed this

Second Day of April 1985

[SEAL]

Attest:

DONALD J. QUIGG

Attesting Officer     Acting Commissioner of Patents and Trademarks